Figure 1:
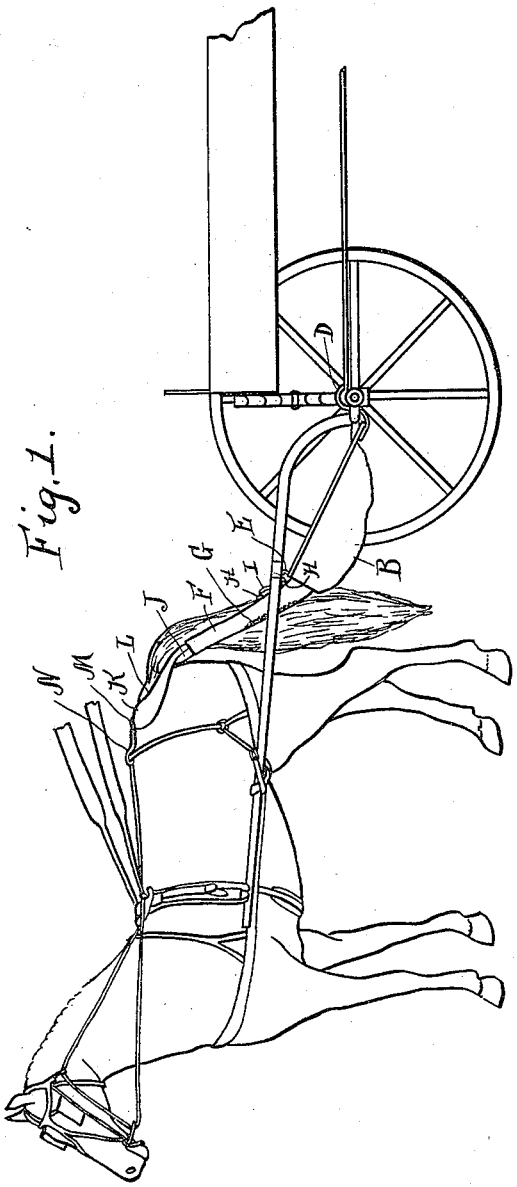

E. B. GILPIN.
OFFAL BAG FOR HORSES AND THE LIKE.
APPLICATION FILED NOV. 3, 1909.

962,211.

Patented June 21, 1910.
2 SHEETS—SHEET 1.

WITNESSES
S. M. Gallagher.
W. W. Williamson.

INVENTOR
Elijah B. Gilpin
BY
ATTORNEY

E. B. GILPIN.
OFFAL BAG FOR HORSES AND THE LIKE.
APPLICATION FILED NOV. 3, 1909.
962,211.
Patented June 21, 1910.
2 SHEETS—SHEET 2.
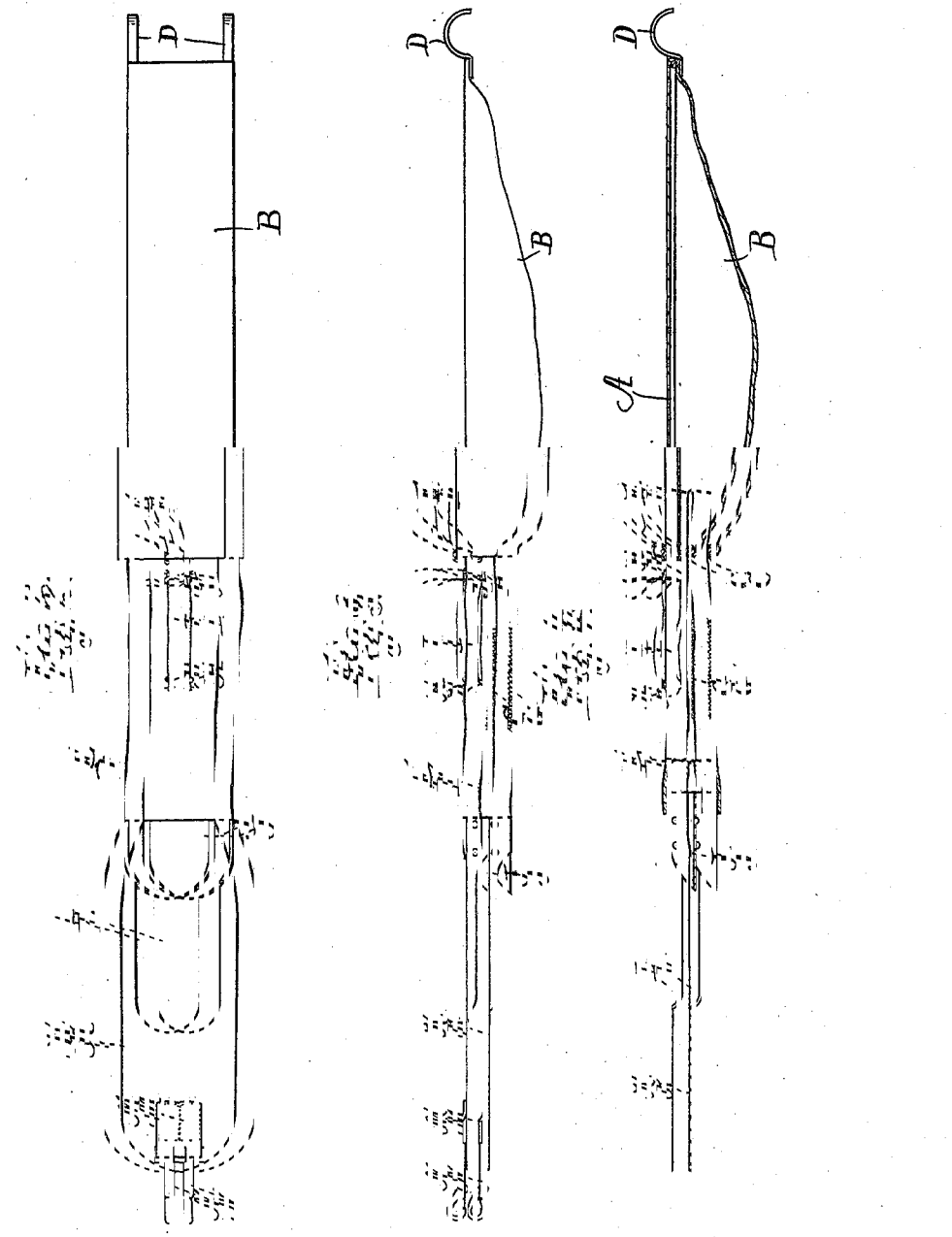

UNITED STATES PATENT OFFICE.

ELIJAH B. GILPIN, OF PHILADELPHIA, PENNSYLVANIA.

OFFAL-BAG FOR HORSES AND THE LIKE.

962,211.

Specification of Letters Patent.   Patented June 21, 1910.

Application filed November 3, 1909.   Serial No. 526,009.

*To all whom it may concern:*

Be it known that I, ELIJAH B. GILPIN, a citizen of the United States, residing at Philadelphia, in the county of Philadelphia and State of Pennsylvania, have invented a certain new and useful Improvement in Offal-Bags for Horses and the Like, of which the following is a specification.

My invention relates to a new and useful improvement in offal bags for horses and the like, and has for its object to provide an exceedingly simple and effective device of this description, one portion of which may be readily attached to the vehicle, the other portion to the harness of the horse, so that the opening thereof will rest beneath the tail of the horse, in this way always being in position to catch the offal.

Another object of the invention is to provide a conveying tube with an open-work portion so that the water may pass therefrom instead of passing into the bag.

With these ends in view, this invention consists in the details of construction and combination of elements hereinafter set forth and then specifically designated by the claim.

In order that those skilled in the art to which this invention appertains may understand how to make and use the same, I will describe its construction in detail, referring by letter to the accompanying drawing forming a part of this specification, in which—

Figure 1 is a side elevation of a horse and portion of a wagon showing the bag in practical use, the near wheel of the wagon being removed. Fig. 2, an enlarged plan view of the device. Fig. 3, a side elevation thereof, and Fig. 4, a longitudinal sectional view.

In carrying out my invention as here embodied, A represents a frame of wire, over which is placed a covering B of canvas or other suitable material, thus forming a bag, the mouth C of which is open. At the end opposite to the mouth are placed the hooks D which engage the front axle of a vehicle to which the device is attached. To the mouth end of the bag is fastened a rope E or its equivalent which is tied to the cross piece of the shafts, thus holding the bag approximately in the position shown in Fig. 1.

F represents the conveying tube, which is formed of material similar to that of the bag, and a portion of this is formed of netting or open-work as indicated by G, so as to permit the draining off of urine, when the device is used upon mares or other female animals. To the upper portion of this conveying tube are placed the eyelets or rings H, through which passes a cord I, whereby the device may be drawn up or shortened along its upper portion, said cords also acting as an anchorage for the tube when tied to the cross piece of the shafts, and this will prevent the end of the tube which enters the bag from being withdrawn. To the outer end of this tube is secured the scoop J, which rests against the hind quarters of the animal beneath its tail. To this scoop is secured the back member K, having an opening L therein through which passes the tail of the animal. On the forward end of this back member is sewn the strap M, to which is fastened the snap hook, adapted to engage a portion of the harness for holding the parts in position.

In practice the bag is fastened to the wagon and the conveying tube to the horse, the scoop being in such position as to catch all offal from which point it will pass through the conveying tube to the bag. While the offal is passing through the conveying tube the urine may pass out through the net work in the under side thereof. When the bag is filled or at any desired time it may be removed and emptied, by untying the cord E and lifting the hooks from the axle of the vehicle and may again be readily replaced for further use.

By the use of my improved bag the movements of the horse's tail will not be interfered with, since none of the parts are attached thereto, and as the conveying tube is tied to the cross piece of the shafts the switching of the tail will not dislodge the same.

Of course I do not wish to be limited to the exact details of construction here shown, as these may be varied within the limits of the appended claim without departing from the spirit of my invention.

Having thus fully described my invention, what I claim as new and useful, is—

In a device of the character described, a bag frame, a covering placed over said bag frame, thus forming a bag, one end thereof being open to form a mouth, hooks secured to the closed end of said bag for detachably securing said end to the axle of a vehicle, a cord fastened to the mouth end of said bag for attaching it to the cross piece of the vehicle shafts, a conveying tube having an open work portion, one end thereof resting in the bag, eyelets, a cord passing through said eyelets for securing said tube to the cross piece of the vehicle shafts, a scoop fastened in one end of said conveying tube, a back member having an opening therein secured to said scoop, and a snap hook fastened to the forward end of said back member for attaching the same to the harness of a horse.

In testimony whereof, I have hereunto affixed my signature in the presence of two subscribing witnesses.

ELIJAH B. GILPIN.

Witnesses:
ADAM NENSTIEL,
A. L. TAYLOR.